United States Patent
Uno

(10) Patent No.: US 6,535,326 B2
(45) Date of Patent: Mar. 18, 2003

(54) ELECTROPHORETIC DISPLAY DEVICE

(75) Inventor: Yoshinori Uno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/986,558

(22) Filed: Nov. 9, 2001

(65) Prior Publication Data

US 2002/0060836 A1 May 23, 2002

(30) Foreign Application Priority Data

Nov. 17, 2000 (JP) ........................................ 2000-350499
Jun. 26, 2001 (JP) ........................................ 2001-193241

(51) Int. Cl.$^7$ ............................ G02B 26/00; G09G 3/38; G01N 27/26
(52) U.S. Cl. .................. 359/296; 359/240; 359/241; 359/245; 359/248; 345/105; 345/107; 204/450; 204/600
(58) Field of Search ................................ 359/296, 238, 359/240, 241, 247, 248, 245, 290; 204/450, 600, 605; 345/105, 107

(56) References Cited

U.S. PATENT DOCUMENTS 3,612,758 A   10/1971  Evans ........................ 348/803
4,695,528 A    9/1987  Dabisch et al. ............. 430/290
6,239,896 B1 *  5/2001  Ikeda ........................ 359/237

FOREIGN PATENT DOCUMENTS

| JP | 49-24695 | 3/1974 | |
| JP | 55-15498 | 12/1980 | |
| JP | 57-82086 | 5/1982 | |
| JP | 9-185087 | 7/1997 | |
| JP | 11-202804 | 7/1999 | |
| JP | 2001249366 A | * 9/2001 | ........... G02F/1/167 |

* cited by examiner

Primary Examiner—Hung Xuan Dang
Assistant Examiner—Tuyen Tra
(74) Attorney, Agent, or Firm—Fitzpatrick, Cella, Harper & Scinto

(57) ABSTRACT

An electrophoretic display device includes a first display electrode and a second display electrode placed on a first substrate, and a second substrate placed in opposition to the first substrate through a bulkhead. Auxiliary display electrodes (projections), each of a projecting structure, are provided on the first display electrode and the second display electrode and along lines of portions where an absolute value of a horizontal component of an electric field generated over the first display electrode and the second display electrode, becomes minimum. A space formed by the first substrate, the second substrate, and the bulkhead is filled with a transparent insulating liquid, and colored electrophoretic particles are dispersed in the insulating liquid.

11 Claims, 8 Drawing Sheets

ELECTROPHORETIC DISPLAY DEVICE

BACKGROUND OF THE INVENTION

1. Field of the Invention

The present invention relates to an electrophoretic display device configured to implement a display based on migration of electrophoretic particles.

2. Related Background Art

In recent years, amounts of data of various information are increasing steadily with development of information devices and outputs of information are provided in various forms. In general, the outputs of information are broadly classified under display on display monitors such as cathode ray tubes, liquid crystal display devices, and so on; and hard copy display on paper by means of printers or the like.

Concerning the display on display monitors, there are increasing needs for low-power-consumption and low-profile display devices, among which the liquid crystal display devices have been and are actively being developed and commercially available as display devices that can meet such needs. The current liquid crystal display devices, however, have problems that letters on the screen are not always clearly viewed, depending upon angles of view to the screen or reflected light and that they exert strains on vision resulting from flicker of a light source, low luminance, etc., which are not solved adequately yet. On the other hand, the monitor display using the cathode ray tubes exhibits satisfactory contrast and luminance, as compared with the liquid crystal display, but it is hardly mentioned that the monitor display can assure adequate display quality, as compared with the hard copy display described hereinafter, because of occurrence of flicker and the like. Another drawback is extremely low portability, because the device is large and heavy.

On the other hand, the hard copy display has been considered to become unnecessary with progress in electronization of information, but it is the present status that a huge number of hard copy outputs are still used in practice. A reason for it is that, in addition to the foregoing problem concerning the display quality, the monitor display of information has the resolution of at most about 120 dpi in general, which is considerably lower than those of printouts on paper (normally, 300 dpi and higher). Therefore, the monitor display imposes greater fatigue on the sense of sight than the hard copy display. As a result, it is often the case that hard copy outputs are made once even if images can be viewed on the display device. Further, the hard-copied information is free of the restriction on the display area to the size of the display device as imposed on the monitor display, many hard copies can be placed in favorable arrangement, hard copies can be rearranged without complicated device operation, and they can be checked one by one, which are also significant reasons for the combinational use of the hard copy display even in the case of the monitor display being available. Moreover, the hard copy display requires no energy for retaining the display, and secures excellent portability of whenever and wherever the information can be checked as long as the volume of information is not extremely large.

As far as display of dynamic picture, frequent rewriting, or the like is not demanded, the hard copy display has the various advantages different from those of the monitor display, but also has the drawback of heavy consumption of paper. Active development is thus under way in recent years to develop rewritable recording media (recording media permitting multiple recording and erasing cycles of images with high visibility and requiring no energy for retaining the display). The third rewritable display method succeeding to the properties of the hard copy display as described above will be called paperlike display.

Necessary conditions for the paperlike display include rewritability, no or adequately low energy necessary for retention of display (memory performance), excellent portability, excellent display quality, and so on. At present, display schemes that can be regarded as the paperlike display, include, for example, reversible display media employing an organic low molecular weight-high molecular weight resin matrix system to effect recording and erasing by a thermal printer head (e.g., Japanese Patent Application Laid-Open Nos. 55-154198 and 57-82086). This system is utilized as display part of some prepaid cards, but it still has such issues that contrast is not so high, that the number of recording and erasing repetitions is relatively small, approximately 150 to 500 cycles, and so on.

Another known display method available as the paperlike display is the electrophoretic display device invented by Harold D. Lees et al. (U.S. Pat. No. 3,612,758). In addition, Japanese Patent Application Laid-Open No. 9-185087 also discloses the electrophoretic display device.

This display device is comprised of a dispersion system having colored electrophoretic particles dispersed in an insulating liquid, and a pair of electrodes opposed to each other with the dispersion system in between. When a voltage is applied through the electrodes to the dispersion system, the electrophoresis of the colored particles causes the colored particles to migrate under the Coulomb force toward the electrode having the opposite polarity to that of the charge of the particles themselves and finally be adsorbed thereto. The display is implemented by making use of the difference between the color of the colored particles and the color of the dyed insulating liquid. Namely, an observer observes the color of the colored particles when the colored particles are adsorbed on the surface of the optically transparent, first electrode closer to the observer; on the contrary, the observer observes the color of the insulating liquid dyed so as to have different optical characteristics from those of the colored particles when the particles are adsorbed on the surface of the second electrode on the far side from the observer.

In the electrophoretic device of this structure, however, it was necessary to mix a coloring material such as a dye, ions, etc. in the insulating liquid. The existence of this coloring material caused new charge exchange and the material tended to act as an unstable factor in the electrophoretic operation, which sometimes resulted in degradation of performance, life, and stability of the display device.

In order to solve this problem, Japanese Patent Application Laid-Open Nos. 49-024695 and 11-202804 suggested the display device in which the electrode pair consisting of the first display electrode and second display electrode was placed on the same substrate and in which the colored electrophoretic particles were moved horizontally in the observer's view. By making use of the electrophoretic property, the colored particles are made to migrate horizontally in a transparent insulating liquid between the first display electrode surface and the second electrode surface under application of voltage, thereby implementing the display.

In the electrophoretic display device of the horizontal migration type, the insulating liquid is transparent, the first display electrode and second display electrode have different colors in the observer's view, and either one color is coincident with the color of the electrophoretic particles. For example, let us suppose the color of the first display electrode is black, the color of the second display electrode white, and the color of the electrophoretic particles black. Then, when the electrophoretic particles are distributed over the first display electrode, the second display electrode is exposed to exhibit white. When the electrophoretic particles are distributed over the second display electrode, the device exhibits black being the color of the electrophoretic particles.

The chemically stable electrophoretic device is implemented in this way.

Meanwhile, an electrophoretic particle is generally subject to a force acting along a direction of an electric field vector and being proportional to magnitude of the electric field vector, which appears between the display electrodes. It is thus ideally desirable that, at each pixel to be rewritten, an electric field of identical strength directed from the starting electrode to the destination electrode be exerted on all the electrophoretic particles over the starting electrode.

In the horizontal migration type electrophoretic display device, however, the magnitude of the electric field vector generated is strong in the peripheral regions of the display electrodes and weak in the central regions of the display electrodes. Further, the orientation of the electric field vector is horizontal in the border regions of the display electrodes and vertical in the central regions of the display electrodes. As a consequence, the absolute value of the horizontal component of the electric field vector becomes minimum in the central regions of the display electrodes. This state is schematically shown in FIG. 14. In the figure arrows represent forces exerted on the electrophoretic particles, directions of the arrows directions of the forces, and lengths of the arrows magnitudes of the forces. As a result, a nonuniform electric field is exerted on the electrophoretic particles over each display electrode in each pixel to be rewritten, and the electric field inappropriate for migration is exerted on the electrophoretic particles in the central region of the starting display electrode, as compared with the electrophoretic particles in the peripheral region of the starting display electrode.

For this reason, the electrophoretic particles in the central region of the display electrode take a longer time for migration to the desired electrode, so that the time can be a hindrance to reduction of drive time. Another possibility is that the particles fail to migrate to the desired electrode and remain existing over the starting electrode, so as to cause degradation of contrast.

SUMMARY OF THE INVENTION

The inventor has conducted the analysis and intensive research on the problem as described above and found that the above problem was able to be solved by modifying the display electrodes into adequate shapes and by providing an additional electrode structure on the display electrodes.

It is, therefore, an object of the invention to provide a horizontal migration type electrophoretic display device that permits electrophoretic particles to migrate to a destination display electrode without remaining over a starting display electrode, so as to achieve excellent display contrast, decrease the response time for display, and reduce a drive voltage without decrease in display contrast, solving the problem in the prior art described above.

Namely, according to the present invention, there is provided an electrophoretic display device comprising a first substrate, at least two display electrodes of a first display electrode and a second display electrode placed on the first substrate, a second substrate placed in opposition to the first substrate, means for applying a desired voltage to each electrode, a transparent insulating liquid filling a space between the first substrate and the second substrate, and a plurality of colored electrophoretic particles dispersed in the transparent insulating liquid, in which the colored particles are made to migrate between the first display electrode and the second display electrode, thereby effecting switching of display, wherein on at least one of the first display electrode and the second display electrode, an auxiliary display electrode is placed at a portion including at least a portion at which an absolute value of a horizontal component of an electric field vector generated over the first display electrode and the second display electrode upon application of the voltages to the first display electrode and the second display electrode, becomes minimum.

A characteristic configuration of the present invention is that the auxiliary display electrode is electrically connected to at least one of the first display electrode and the second display electrode located below the auxiliary display electrode.

Another characteristic configuration of the present invention is that the auxiliary display electrode is a projecting structure provided on at least one of the first display electrode and the second display electrode.

Another characteristic configuration of the present invention is that the auxiliary display electrode is an electrode placed through an insulating layer on at least one of the first display electrode and the second display electrode.

Another characteristic configuration of the present invention is that the auxiliary display electrode is placed in a region including a pixel peripheral portion on at least one of the first display electrode and the second display electrode.

DETAILED DESCRIPTION OF THE PREFERRED EMBODIMENTS

The embodiments of the present invention will be described below in order.

The first feature of the electrophoretic display device of the present invention is an electrophoretic display device comprising a first substrate, at least two display electrodes of a first display electrode and a second display electrode placed on the first substrate, a second substrate placed in opposition to the first substrate, means for applying a desired voltage to each electrode, a transparent insulating liquid filling a space between the first substrate and the second substrate, and a plurality of colored electrophoretic particles dispersed in the transparent insulating liquid, in which the colored particles migrate between the first display electrode and the second display electrode, thereby effecting switching of display, wherein on the first display electrode or the second display electrode, an auxiliary display electrode is placed at a portion including at least a portion at which an absolute value of a horizontal component of an electric field vector generated over the first display electrode and the second display electrode upon application of the voltages to the first display electrode and the second display electrode, becomes minimum.

Figure 1:
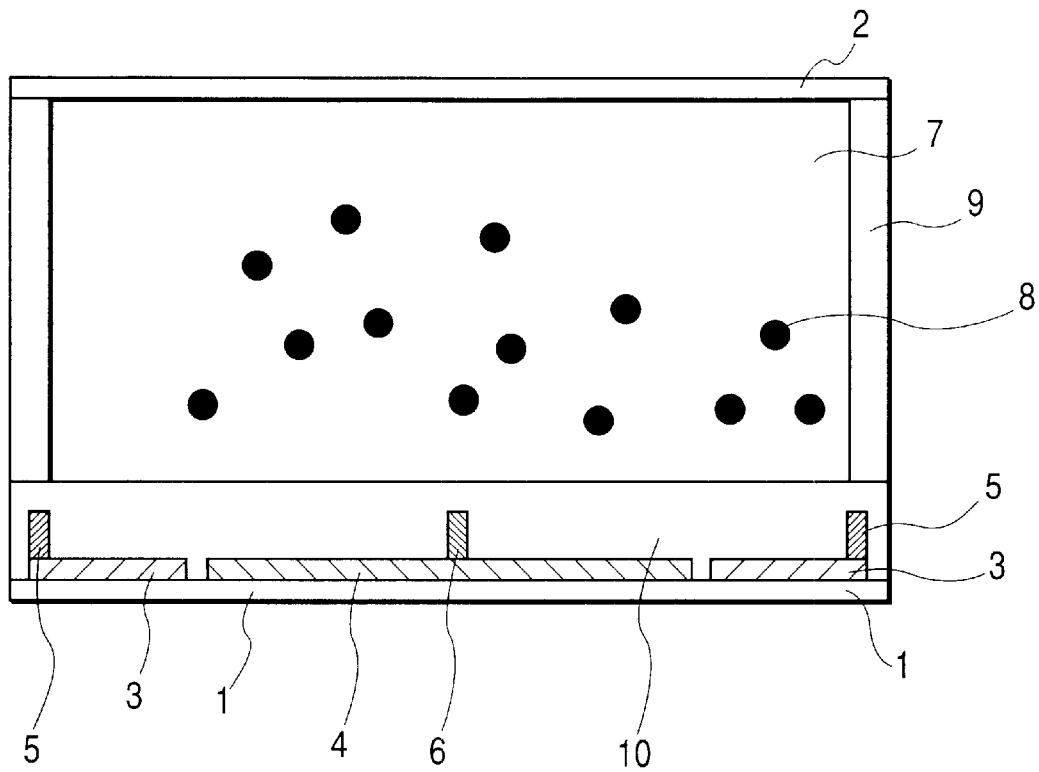
FIG. 1 is a sectional view showing a typical example of a display device according to the present invention.
Figure 15:
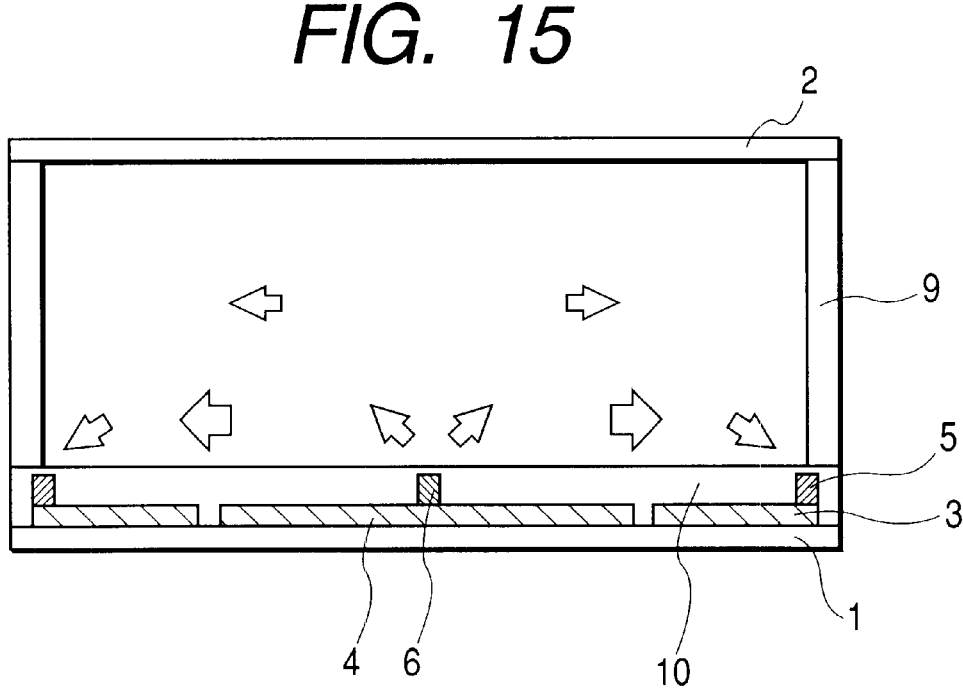
FIG. 15 is a view showing a typical example of electric field vectors generated in the display device of the present invention.

FIG. 1 shows an example of a cross-sectional, structural view of a typical configuration of the electrophoretic display device according to the present invention. FIG. 1 shows a pixel constituting the display device of the present invention. A first display electrode 3 and a second display electrode 4 are placed on a first substrate 1, and a second substrate 2 is opposed to the first substrate 1 through a bulkhead 9. The outstanding feature of the present invention is possession of auxiliary display electrodes at portions including at least portions at each of which the absolute value of the horizontal component of the electric field vector generated over the first display electrode 3 and the second display electrode 4 upon application of the drive voltages to the first display electrode 3 and the second display electrode 4, becomes minimum. In the example of FIG. 1, the device has the auxiliary display electrodes (hereinafter referred to as projections of display electrodes) 5, 6 each of a projecting structure on the first display electrode 3 and on the second display electrode 4 along lines of the portions where the absolute value of the horizontal component of the electric field generated over the first display electrode 3 and the second display electrode 4 becomes minimum. As a result, electric field vectors generated around the auxiliary display electrodes come to have a large horizontal component, and thus the electric field vectors become suitable for the migration of the electrophoretic particles. This state is schematically shown in FIG. 15. In the figure, the arrows represent forces exerted on the electrophoretic particles, the orientations of the arrows represent the directions of the forces, and the lengths of the arrows represent the magnitudes of the forces. The space formed by the first substrate 1, the second substrate 2, and the bulkhead 9 is filled with a transparent insulating liquid 7, and colored electrophoretic particles 8 are dispersed in the insulating liquid.

Figure 2:
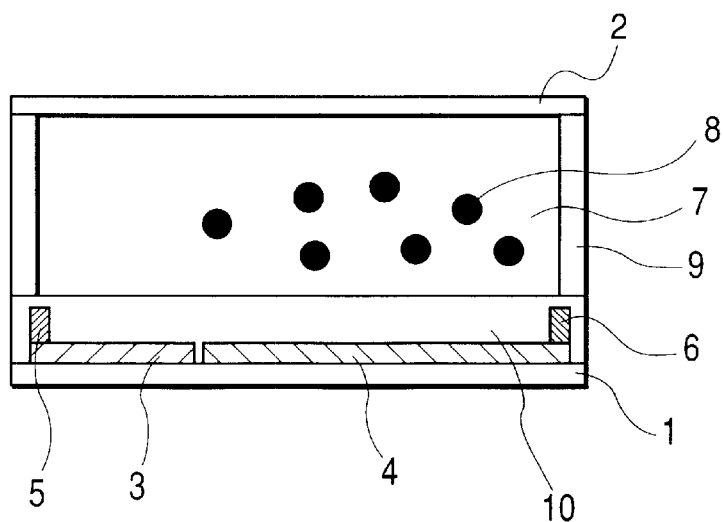
FIG. 2 is a sectional view showing another typical example of a display device according to the present invention.
Figure 3:
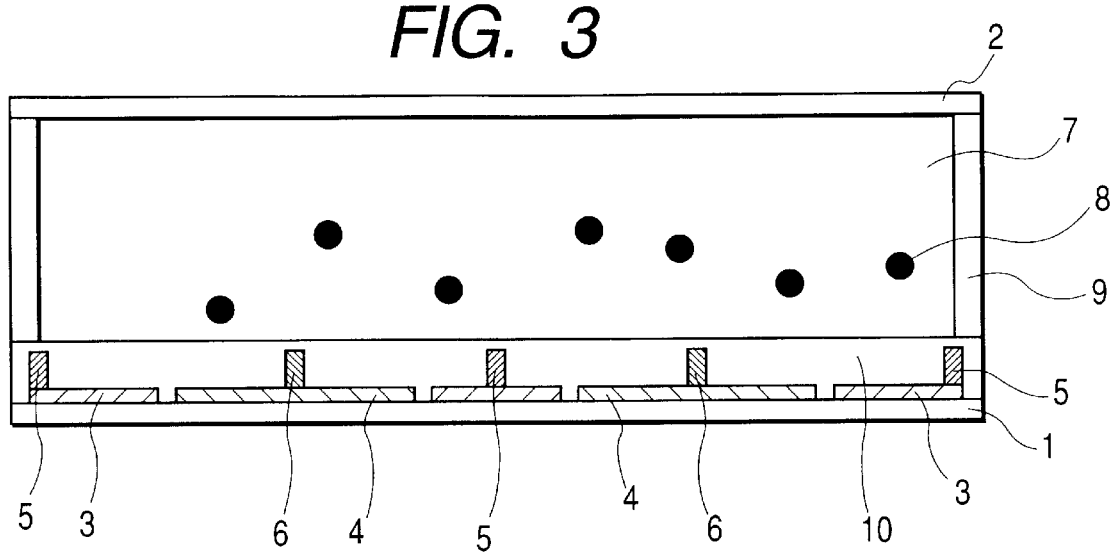
FIG. 3 is a sectional view showing still another typical example of a display device according to the present invention.
Figure 4:
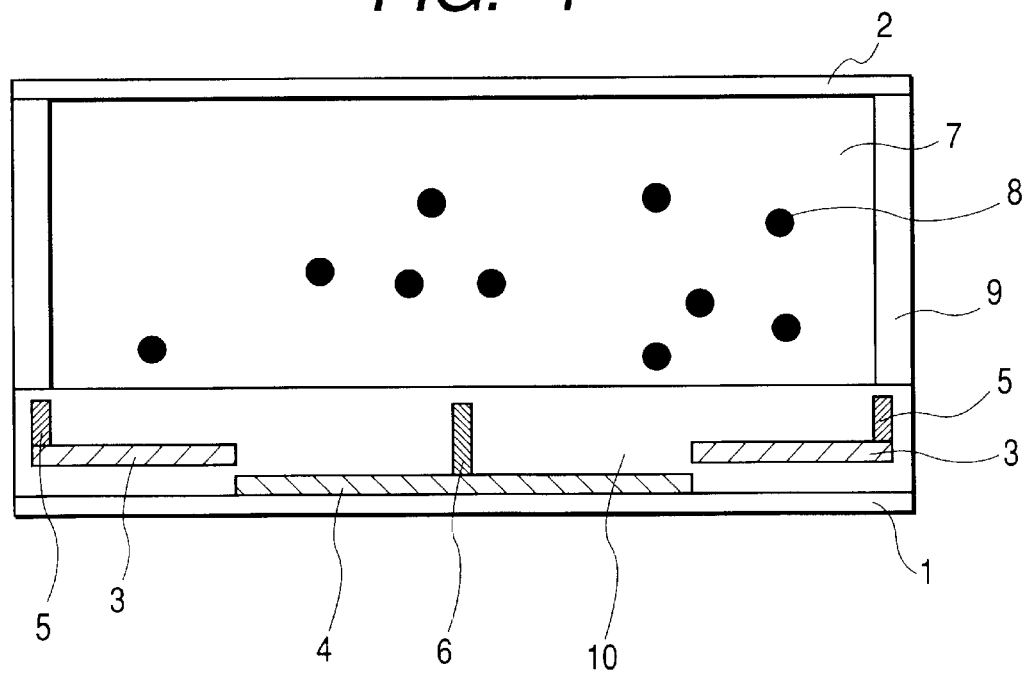
FIG. 4 is a sectional view showing still another typical example of a display device according to the present invention.
Figure 5:
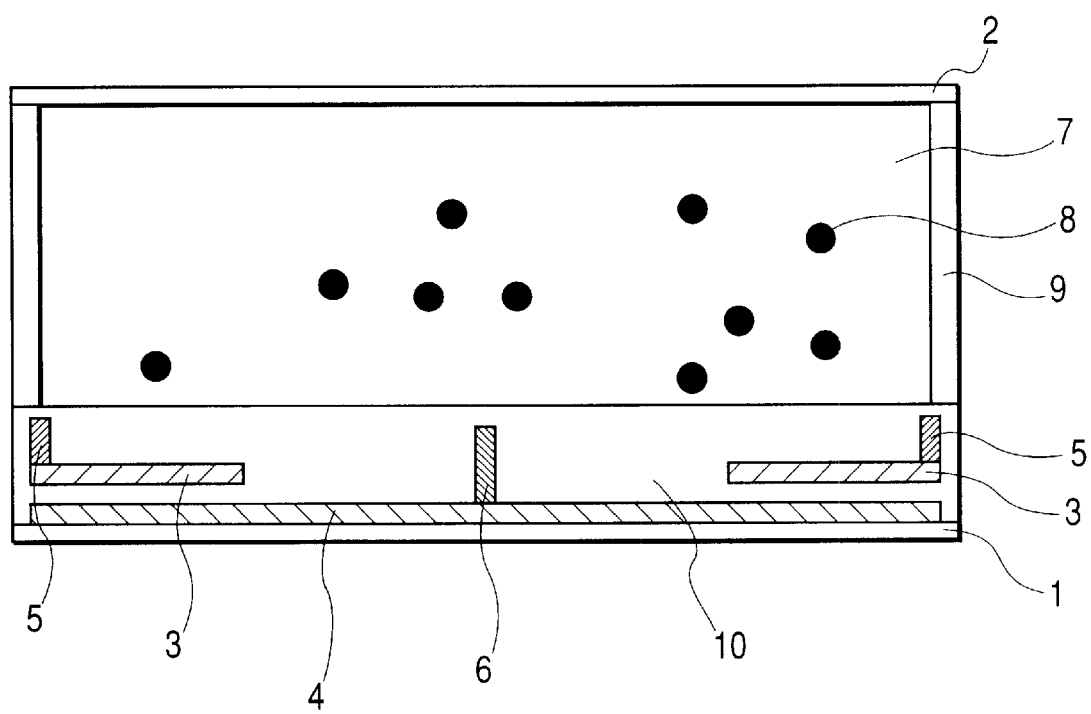
FIG. 5 is a sectional view showing still another typical example of a display device according to the present invention.

There are no specific restrictions on the number of display electrodes included in each pixel if there are provided at least one pair of a first display electrode and a second display electrode. Conceivable configurations include the device having the first display electrode 3 and the second display electrode 4 one each (FIG. 2), and the device having them in plurality respectively (FIG. 3: an example of the device having three first display electrodes and two second display electrodes). In the example of FIG. 1 the device includes two first display electrodes and one second display electrode. There are no specific restrictions on the placement of the first display electrode 3 and the second display electrode 4, either. There are the following conceivable configurations: the first display electrode 3 and the second display electrode 4 are placed on the same plane (FIG. 1); the first display electrode 3 and the second display electrode 4 are placed on respective, different planes (FIG. 4); one display electrode is laid in an insulated state on the other display electrode (FIG. 5: an example of a configuration wherein the first display electrode 3 is laid on the second display electrode 4), and so on.

There are no specific restrictions on the shapes of the first display electrode 3 and the second display electrode 4, either. The first and second display electrodes are adaptable for arbitrary shapes; e.g., typical shapes including a stripe pattern in which the first display electrodes 3 and second display electrodes 4 are alternately arranged (FIG. 6), a closed loop pattern in which the first display electrode 3 and the second display electrode 4 are rectangular, circular, or the like (FIG. 7), and so on. FIG. 1 to FIG. 5 show examples wherein a bulkhead 9 is formed at every pixel, but it does not always have to be formed at every pixel. A plurality of pixels may be included between adjacent bulkheads.

Figure 8:
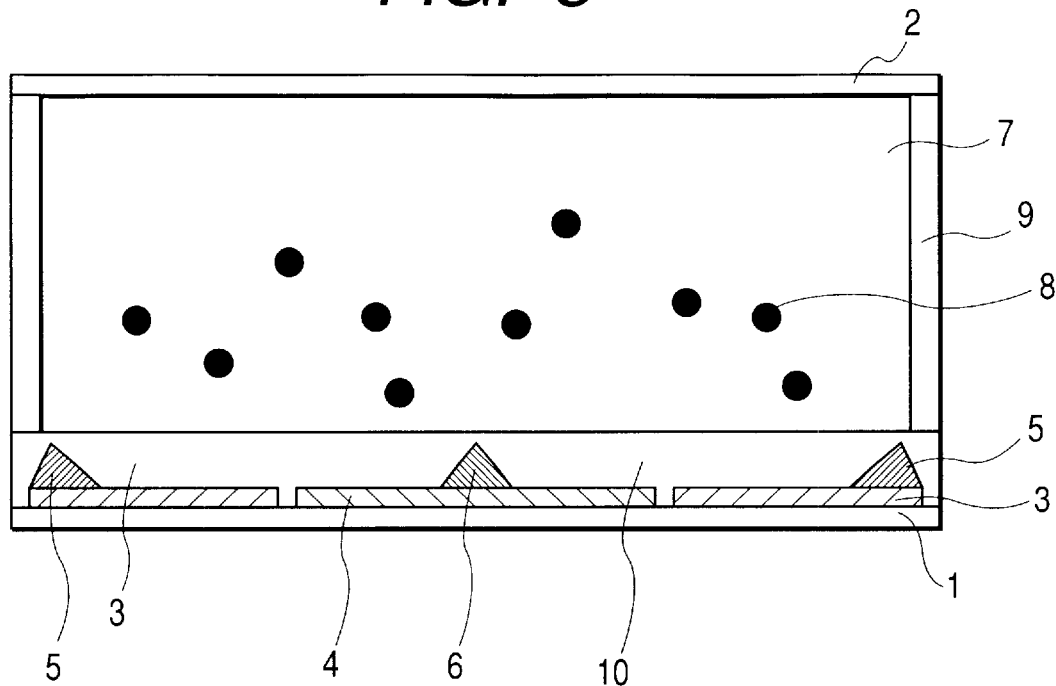
FIG. 8 is a view showing another example of a typical cross section of a display device according to the present invention.
Figure 9:
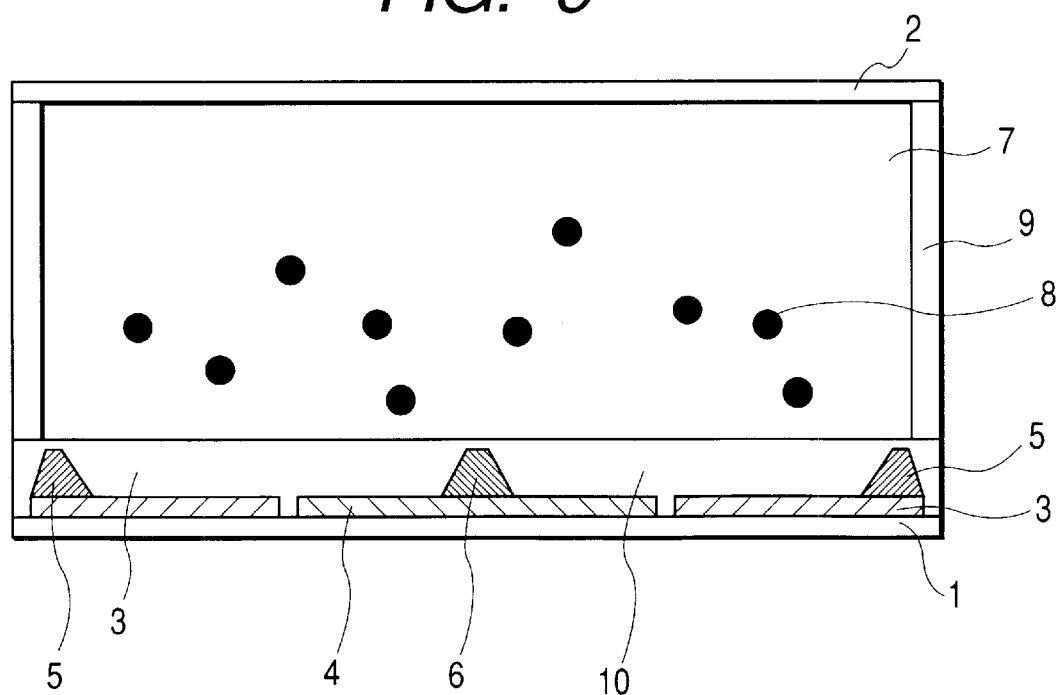
FIG. 9 is a view showing still another example of a typical cross section of a display device according to the present invention.
Figure 10:
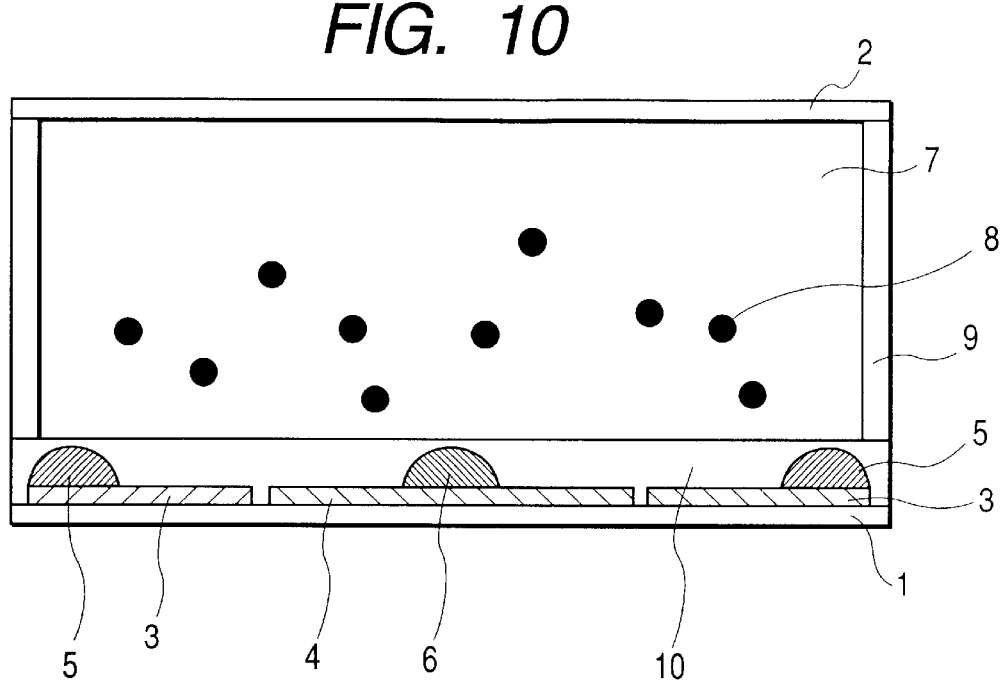
FIG. 10 is a view showing still another example of a typical cross section of a display device according to the present invention.
Figure 11:
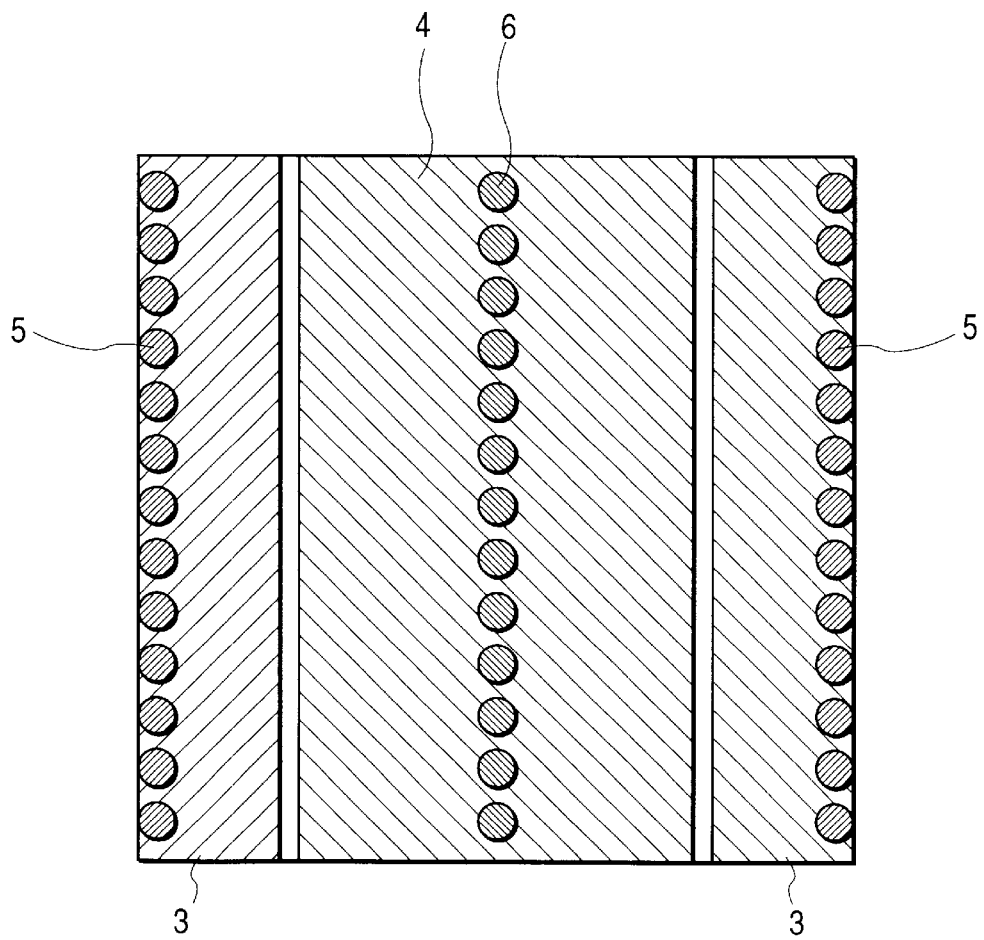
FIG. 11 is a view showing still another example of a typical plan view of a display device according to the present invention.

The projections of display electrodes are formed at the portions including at least the portions at each of which the absolute value of the horizontal component of the electric field generated over the first display electrode 3 and the second display electrode 4 upon application of the drive voltages to the first display electrode 3 and the second display electrode 4, becomes minimum. There are no specific restrictions on the shapes of the respective projections of the display electrodes. Examples of cross-sectional profiles of the projections of display electrodes include the rectangular shape (FIG. 1), the triangular shape (FIG. 8), the trapezoidal shape (FIG. 9), the arch shape (FIG. 10), and so on. In either case, the width of the bottom surface of each projection of display electrode is smaller than the width of the display electrode. When the shapes of the display electrodes are of the stripe pattern, the triangular wave pattern, the closed loop pattern such as the rectangular shape or the circular shape, or the like, it is desirable that the projections be placed on lines of the portions where the magnitude of the horizontal component of the electric field vector is minimum upon application of the drive voltages to the display electrodes (FIG. 6), or on part of the lines (FIG. 11), preferably, on each display electrode. Providing the projections in the peripheral region and border region of a pixel is also one of preferred configurations. When the auxiliary display electrodes are placed in the peripheral region of a pixel, particles in the pixel peripheral region become migrating better.

For the purpose of preventing injection of charge into the electrophoretic particles 8 and other purposes, a surface insulating layer 10 may be formed on these display electrodes and on the projections of the display electrodes as occasion demands. Concerning the thickness of the surface insulating layer 10, the surface electrodes and the projections of the surface electrodes may be coated with a thin insulating layer, preferably, of not more than 1 $\mu$m in thickness, or the surface electrodes and the projections may be covered by the insulating layer 10 so that the surface of the insulating layer 10 becomes flat on the display electrodes and the projections, as in the example of FIG. 1. It is, however, preferable that the thickness of the surface insulating layer 10 on the projections of display electrodes be not more than 1 $\mu$m (the same will also apply to the following).

Specific preferred dimensions in the configuration of FIG. 1 are as follows: e.g., for the pixel size of 100 $\mu$m×100 $\mu$m, the particle size of the electrophoretic particles is 5 $\mu$m, the distance between the first substrate and the second substrate is 70 $\mu$m, the ratio of the area of each electrode to the total pixel area is 30% for the first display electrodes 3 and 70% for the second display electrode 4, and the projections of the respective display electrodes preferably have the height of not less than 1 $\mu$m nor more than 20 $\mu$m on each display electrode and the width of not less than 5% nor more than 20% of the width of the display electrode.

The projections can be made by the conventionally known methods such as evaporation of metal, electroplating, and so on. The pattern can also be formed by the conventionally known techniques, including the patterning method by the photolithography technology, the evaporation method through a mask, and so on.

The colors of the respective components of each cell can be determined in an arbitrary combination. For example, a conceivable color combination is such that the electrophoretic particles 8 are black, the first display electrode 3 is black, the second display electrode 4 is white, and the projections of the respective display electrodes are such colors as to be visible in the same colors as those of the respective display electrodes. In this combination, display can be switched between white color display and black color display. It is also feasible to implement color display, by arranging pixels in which the second display electrode 4 and the projection 6 of the second display electrode are viewed as R, G, or B. The expression "colors of electrodes" stated herein does not always mean that the electrodes themselves have to be colored, but the colors of the electrodes mean the colors of the regions occupied by these electrodes that are viewed by an observer, for instance, by placing color layers on these electrodes, or by making part or all of these electrodes transparent and placing a color layer or a reflecting layer below each electrode (the same will also apply to the following).

Further, the auxiliary display electrodes do not always have to be provided corresponding to both the first display electrode and second display electrode, but in the case wherein only either one is provided therewith, it is preferable to provide the auxiliary display electrode on the display electrode with the wider area, i.e., on the second display electrode in the configurations of FIG. 1 to FIG. 11.

Next, the driving method will be described below. Let Vd1 be the voltage applied to the first display electrodes 3, and Vd2 be the voltage applied to the second display electrode 4. Suppose the polarity of the charge on the electrophoretic particles 8 is positive. The drive voltages are, for example, Vd1=−50 V and Vd2=50 V in the case of black color display, and Vd1=50 V and Vd2=−50 V in the case of white color display.

Figure 12:
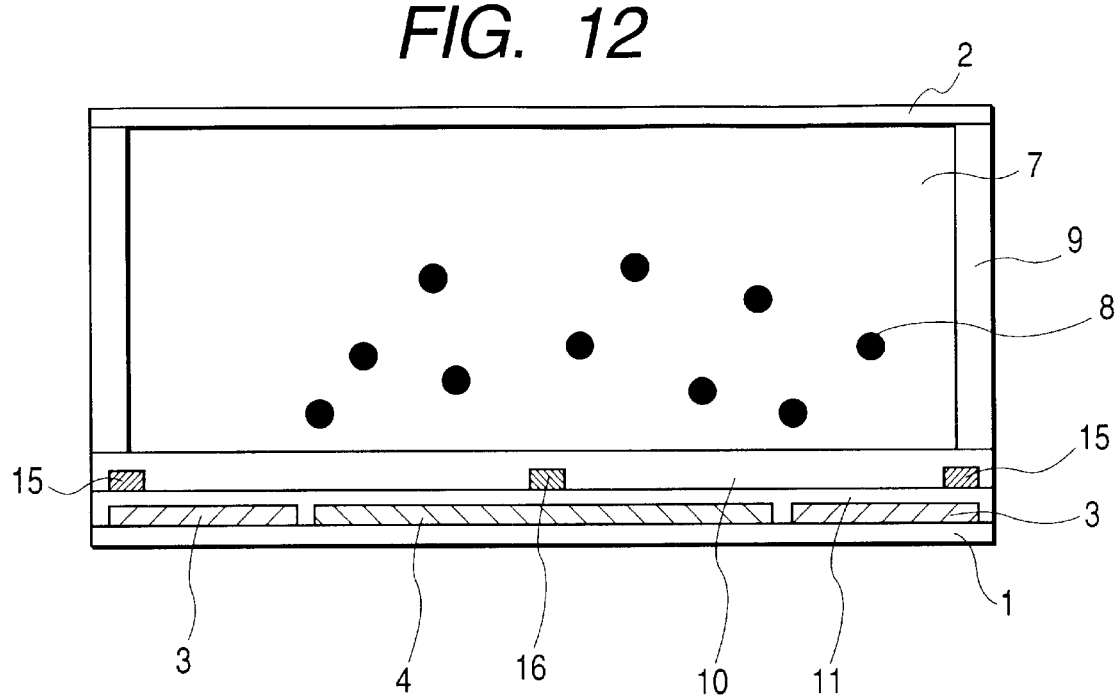
FIG. 12 is a view showing still another example of a typical cross section of a display device according to the present invention.

FIG. 12 shows an example of a cross-sectional, structural view of another typical configuration of the electrophoretic display device of the present invention.

The auxiliary display electrodes (projections of display electrodes) described in FIG. 1 to FIG. 11 were directly formed on the corresponding display electrodes, whereas the device may also be configured to provide the auxiliary display electrodes 15, 16 through interposition of an adequate insulating layer 11 on the display electrodes 3, 4, as in the case of the example shown in FIG. 12. The drive voltages are identical voltages to the respective display electrodes and the auxiliary display electrodes on the display electrodes, as in the case of the configurations from FIG. 1 to FIG. 11. This configuration shown in FIG. 12 can be expected to achieve the effect similar to that in the case wherein the projections of the display electrodes having the same height as the height of the insulating layer 11 between the display electrodes and the auxiliary display electrodes in the example of FIG. 12 are employed in the configurations of FIG. 1 to FIG. 11. Further, the present configuration permits the distance between the auxiliary display electrodes and the display electrodes to be increased relatively easily by the introduction of the insulating layer.

Specific preferred dimensions in the configuration of FIG. 12 are as follows: e.g., for the pixel size of 100 $\mu$m×100 $\mu$m, the particle size of the electrophoretic particles is 5 $\mu$m, the distance between the first substrate and the second substrate is 70 $\mu$m, the ratio of the area of each electrode to the total pixel area is 30% for the first display electrodes 3 and 70% for the second display electrode 4, the thickness of the insulating layer 11 between the display electrodes and the auxiliary display electrodes is preferably not less than 1 $\mu$m nor more than 20 $\mu$m, and the width of the auxiliary display electrodes is preferably not less than 5% nor more than 20% of the width of the display electrode.

The colors of the respective components in each cell can be selected in an arbitrary combination. For example, in a combination where the electrophoretic particles 8 are black, visible regions of the first display electrodes 3 and the auxiliary display electrodes 15 thereof are black, and visible regions of the second display electrode 4 and the auxiliary display electrode 16 thereof are white, the display can be switched between white color display and black color display. It is also feasible to implement colored display, by arranging pixels in which the second display electrode 4 and the auxiliary display electrode 16 on the second display electrode 4 are viewed as R, G, or B.

The driving method will be described below. Let Vd1 be the voltage applied to the first display electrodes 3 and auxiliary display electrodes 15, and Vd2 be the voltage applied to the second display electrode 4 and the auxiliary display electrode 16. Suppose the polarity of the charge on the electrophoretic particles 8 is positive. The drive voltages are, for example, Vd1=−50 V and Vd2=50 V in the case of black color display and Vd1=50 V and Vd2=−50 V in the case of white color display.

A method of fabricating the display device in the present embodiment will be described below with reference to FIG. 1.

First, the first display electrodes 3 and second display electrode 4 are formed and patterned on the first substrate 1. The material of the substrate can be selected from polymer films of poly(ethylene terephthalate) (PET), polyether sulfone (PES), and so on, or inorganic materials such as glass, quartz, and so on. The material of the display electrodes can be any electroconductive material that can be patterned.

Then, the projections of display electrodes are formed on the display electrodes so as to make the auxiliary display electrodes 5, 6. After that, the surface insulating layer 10 is formed so as to cover the auxiliary display electrodes 5, 6 adequately. The material of the insulating layer is preferably either of materials that can form a thin film, that are resistant to formation of pinhole, and that have a low dielectric constant (permittivity). For example, the material of the insulating layer can be selected from amorphous fluororesin, highly transparent polyimide, PET, and so on. The thickness of the surface insulating layer 10 is preferably not more than about 1 $\mu$m.

The coloring of the display electrode surfaces 3, 4 and the projections 5, 6 of the display electrodes can be implemented by making use of the color of each electrode material or the material itself of the surface insulating layer formed thereon, or by forming a material layer of a desired color on at least one of the electrodes and on the insulating layer. The coloring may also be implemented by making both or either one of the first display electrodes 3 and the second display electrode 4 transparent and placing an appropriate coloring layer below the transparent electrode(s).

Then, the bulkhead 9 is formed on the second substrate. There is no limitation to the placement of the bulkhead 9, but it is preferable to place the bulkhead(s) so as to surround the circumference of each pixel, in order to prevent the electrophoretic particles 8 from migrating between pixels. However, the pixel arrangement is not always limited to the arrangement wherein one pixel is placed in each area surrounded by the bulkhead, but a plurality of pixels may be placed in each area as long as there arises no problem. The material of the bulkhead is a polymer resin. The bulkhead may be formed by any method. For example, the bulkhead can be formed by using either one method selected from a method of laying a photosensitive resin layer on the substrate and thereafter performing exposure and wet development thereof, a method of bonding the bulkhead produced separately, to the substrate, a method of forming the bulkhead by printing, a method of forming the bulkhead on the surface of the optically transparent, first substrate by a mold, and so on.

Then, the transparent insulating liquid 7 and the colored electrophoretic particles 8 are put into each pixel space surrounded by the bulkhead. The insulating liquid 7 is a colorless, transparent liquid, e.g., silicone oil, toluene, xylene, high purity petroleum, or the like. The black electrophoretic particles 8 are particles of a material that demonstrates good charging characteristics in the insulating liquid. For example, the material of the particles 8 is selected from resins, such as polyethylene, polystyrene, and the like, mixed with carbon or the like. There is no limitation to the particle size of the electrophoretic particles 8, but the particles are normally used in the particle size of about 0.5 $\mu$m to 20 $\mu$m.

Lastly, an adhesive layer is formed on the joint surfaces of the first substrate 1 and the second substrate 2, thereafter alignment is made between the first substrate and the second substrate, and heat is applied to bond them. A voltage applying means is connected to it, thereby completing the display device.

A method of fabricating the configuration provided with the auxiliary display electrodes as shown in FIG. 12 will be described below.

The first display electrodes 3 and second display electrode 4 are formed and patterned on the first substrate 1. The material of the substrates is selected from the polymer films such as poly(ethylene terephthalate) (PET), polyether sulfone (PES), and so on, or the inorganic materials such as glass, quartz, and so on. The material of the display electrodes can be any electroconductive material that can be patterned.

Then, the insulating layer is formed on the display electrodes. The material of the insulating layer is preferably either of materials that can form a thin film, that are resistant to formation of pinhole, and that have a low dielectric constant, and can be selected, for example, from amorphous fluororesin, highly transparent polyimide, PET, and so on. The thickness of the insulating layer is preferably about 1 $\mu$m to 15 $\mu$m.

Subsequently, the auxiliary display electrodes 15, 16 are formed and patterned on the insulating layer. The material of the auxiliary display electrodes can be any electroconductive material that can be patterned and they are, for example, transparent electrodes of indium tin oxide (ITO). The auxiliary display electrodes 15, 16 may be transparent, but their colors may also be coincident with those of the corresponding display electrodes. After that, the insulating layer 11 on the display electrodes may be removed except below the auxiliary display electrodes 15, 16. Further, the surface insulating layer 10 may also be formed thereon. The material and thickness of the insulating layer are those described previously. The material of the walls is selected from the polymer resins and the like.

The coloring of the display electrode surfaces 3, 4 and the auxiliary display electrodes 15, 16 may be implemented by making use of the color of the electrode material or the material itself of the insulating layer formed thereon, or by forming a material layer of desired color on the electrodes and/or on the insulating layer. The coloring may also be implemented by making both or either one of the first display electrodes 3 and the second display electrode 4 transparent and providing an appropriate coloring layer below the electrode(s).

Then, the bulkhead 9 is formed on the second substrate. There is no limitation to the placement of the bulkhead 9, but it is preferable to place the bulkhead(s) so as to surround the circumference of each pixel, in order to prevent the electrophoretic particles 8 from migrating between pixels. However, the pixel arrangement is not always limited to the arrangement wherein one pixel is placed in each area surrounded by the bulkhead, but a plurality of pixels may be placed in each area as long as there arises no problem. The material of the bulkhead is a polymer resin. The bulkhead may be formed by any method. For example, the bulkhead can be formed by using either one method selected from the method of laying the photosensitive resin layer on the substrate and thereafter performing the exposure and wet development thereof, the method of bonding the bulkhead produced separately, to the substrate, the method of forming the bulkhead by printing, the method of forming the bulkhead on the surface of the optically transparent, first substrate by a mold, and so on.

Then, the transparent insulating liquid 7 and the colored electrophoretic particles 8 are put into each pixel space surrounded by the bulkhead. The insulating liquid 7 is a colorless, transparent liquid such as silicone oil, toluene, xylene, high purity petroleum, or the like. The black electrophoretic particles 8 are particles of a material that demonstrates good charging characteristics in the insulating liquid. For example, the electrophoretic particles 8 are particles of either of the resins, such as polyethylene, polystyrene, and so on, mixed with carbon or the like. There is no limitation to the particle size of the electrophoretic particles 8, but the particles are normally used in the particle size of about 0.5 µm to 20 µm.

Lastly, the adhesive layer is formed on the joint surfaces between the first substrate 1 and the second substrate 2, thereafter alignment is made between the first substrate and the second substrate, and heat is applied thereto to bond them. The voltage applying means is connected to it so as to apply the identical voltages to the display electrodes and to the auxiliary display electrodes formed thereon, thereby completing the display device.

The present invention will be described below in further detail in accordance with examples thereof.

EXAMPLE 1

In the present example the electrophoretic display device was produced and driven in the cell structure shown in FIG. 12. A plan view of the display device produced is presented in FIG. 13. The device size was 100 µm×100 µm and the area ratio of the first display electrodes, the second display electrode, and the auxiliary display electrodes was 30:70:5.

Figure 13:
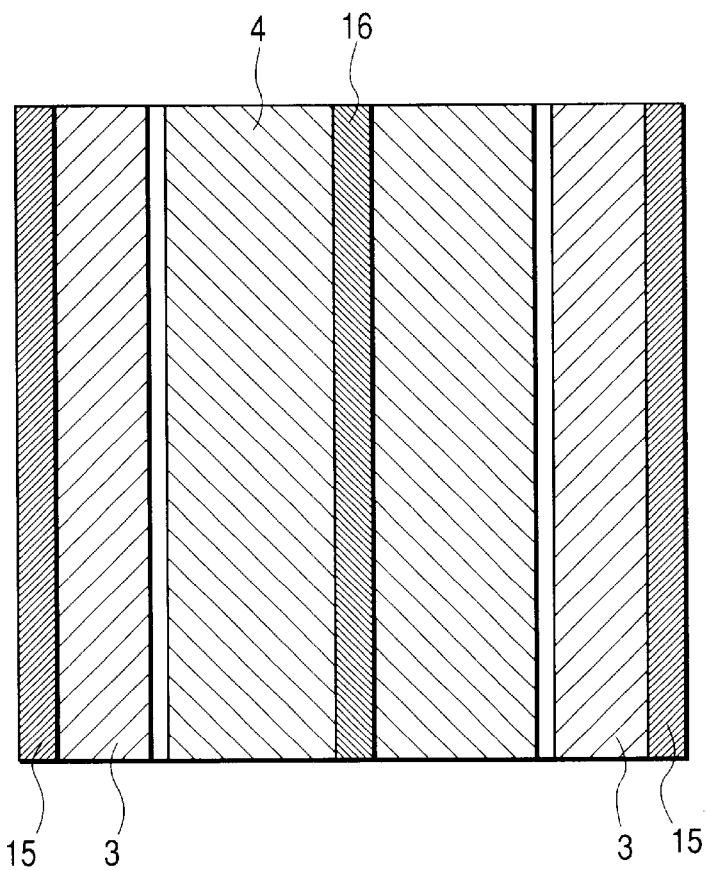
FIG. 13 is a view showing still another example of a typical plan view of a display device according to the present invention.
Figure 14:
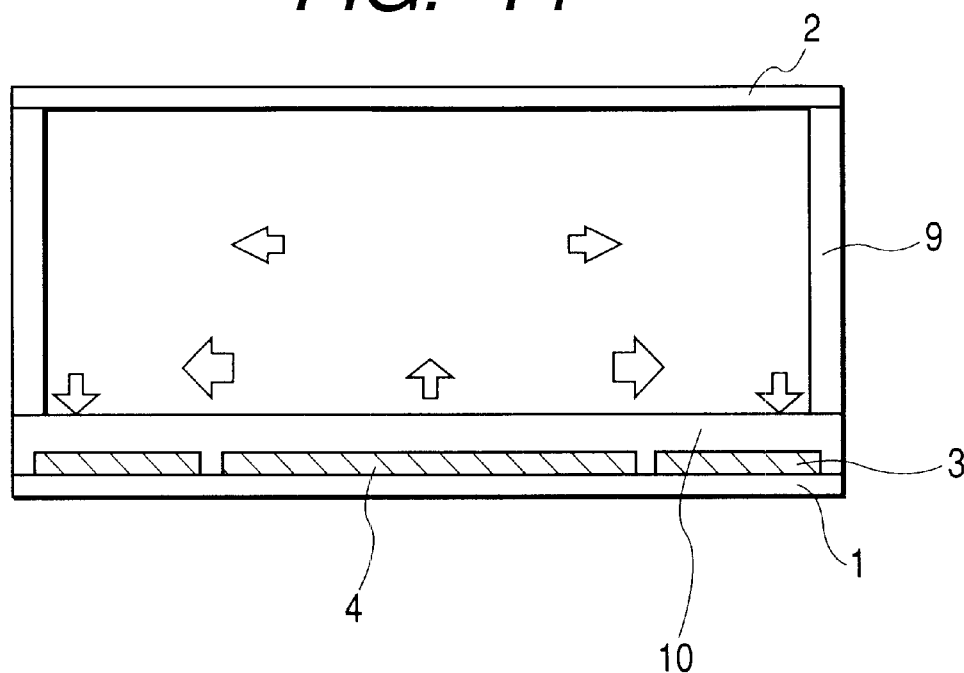
FIG. 14 is a view showing a typical example of electric field vectors generated in the conventional display device.

A method of producing the cell will be briefly described below with reference to FIG. 12 and FIG. 13. An aluminum film for the first and second display electrodes 3, 4 was deposited on the first substrate 1, which was the PET film having the thickness of 200 µm. Then, the aluminum film was patterned in the shape shown in the figures, by photolithography and dry etching. Then, the insulating layer 11 was made of an amorphous fluororesin and in the thickness of 10 µm over the entire surface. Then, a film of ITO was deposited as the auxiliary display electrodes 15, 16 at low temperatures, and then patterned in the shape shown in the figures, by photolithography and dry etching. In order to apply the identical voltage as a drive voltage to the display electrodes 3 and to the auxiliary display electrodes 15, they are provided with a common terminal on the first substrate. The display electrode 4 and the auxiliary display electrode 16 are also provided similarly with a common terminal. Then, the insulating coloring layer, which was an acrylic resin with a white pigment of alumina or the like dispersed therein, was formed over the entire surface and thereafter a dark resin film was deposited over the first display electrodes 3.

Subsequently, the bulkheads 9 were formed on the second substrate 2 of the PET film. The bulkheads 9 were made by applying the photosensitive epoxy resin onto the substrate and thereafter performing exposure and wet development thereof, and had the height of 70 µm. The insulating liquid 7 and the black electrophoretic particles 8 were put into the interior space of the bulkheads thus formed. The insulating liquid 7 was silicone oil. The black electrophoretic particles 8 were particles of a mixture of polystyrene and carbon, the average particle size of which was about 5 µm. The electrophoretic particles 8 in silicone oil exhibited the positive polarity of charge. Then, a pattern of a hot-melt adhesive layer was formed on the bonding surface of the first substrate 1 to the second substrate 2, the first substrate 1 was laid on the bulkheads of the second substrate 2 while achieving alignment between them, and heat was applied thereto to bond them. A voltage applying circuit not shown was connected to it, thus forming the display device.

The driving method will be described. Let Vd1 be the voltage applied to the first display electrodes 3 and to the auxiliary display electrodes 15, and Vd2 be the voltage applied to the second display electrode 4 and to the auxiliary display electrode 16. The display device was driven under the conditions: the driving voltages Vd1=+80 V and Vd2=−80 V or Vd1=−80 V and Vd2=+80 V; the voltage applying time 100 msec. The electrophoretic particles migrated onto the destination display electrode(s) without remaining on the starting display electrode(s), thus achieving excellent display contrast. Further, it was also verified that good display contrast was also able to be attained even under the conditions: the driving voltages Vd1=+80 V and Vd2=−80 V or Vd1=−80 V and Vd2=+80 V; the voltage applying time reduced from 100 msec to 50 msec. Further, the display contrast was not degraded even in the driving under the conditions: the voltage applying time 100 sec; the driving voltages lowered to Vd1=+50 V and Vd2=−50 V or Vd1=−50 V and Vd2=+50 V.

EXAMPLE 2

In the present example the electrophoretic display device was produced and driven in the cell structure shown in FIG. 1. A plan view of the display device produced is presented in FIG. 6. The device size was 100 µm×100 µm and the area ratio of the first display electrodes 3, the second display electrode 4, and the auxiliary display electrodes 5, 6 was 30:70:5.

Figure 6:
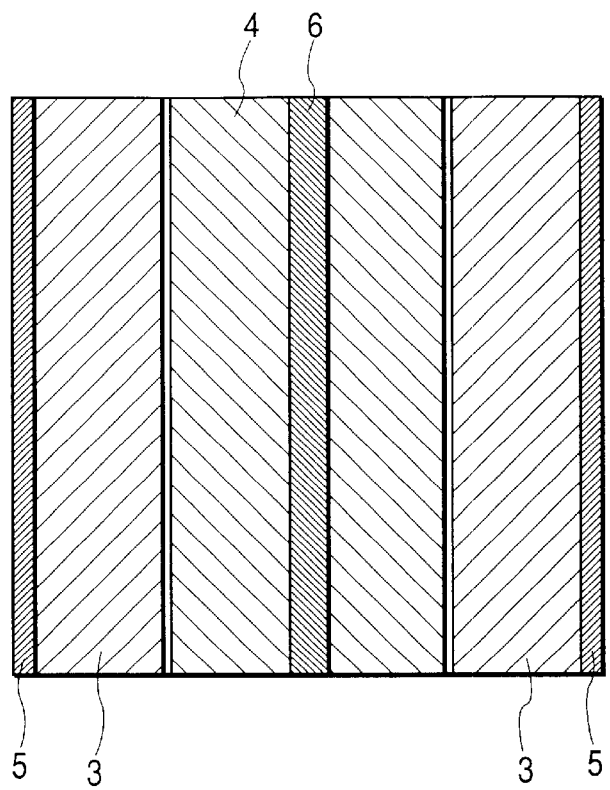
FIG. 6 is a plan view showing a typical example of a display device according to the present invention.
Figure 7:
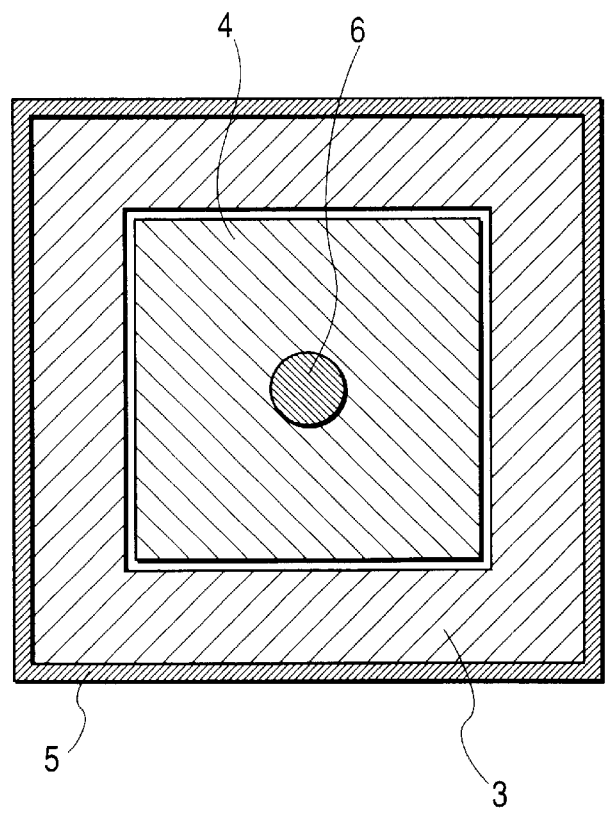
FIG. 7 is a view showing another example of a typical plan view of a display device according to the present invention.

A method of producing the cell will be briefly described below with reference to FIG. 1 and FIG. 6. An aluminum film for the first and second display electrodes 3, 4 was deposited on the first substrate 1, which was the PET film having the thickness of 200 µm. Then, the aluminum film was patterned in the shape shown in the figures, by photolithography and dry etching. Then, a resist pattern for the auxiliary display electrodes was made by photolithography, and the auxiliary display electrodes 5, 6 were formed by the electroplating method. After that, the resist film was removed and the white surface insulating layer 10 was made in the thickness of 1 µm. After that, a dark resin film was deposited over the first display electrodes 3 and the auxiliary display electrodes 5.

Subsequently, the bulkheads 9 were formed on the second substrate 2 of the PET film. The bulkheads 9 were made by applying the photosensitive epoxy resin onto the substrate and thereafter performing the exposure and wet development thereof, and they had the height of 70 µm. Then, the insulating liquid 7 and the black electrophoretic particles 8 were put into the interior space of the bulkheads thus formed. The insulating liquid 7 was silicone oil. The black electrophoretic particles 8 were particles of a mixture of polystyrene and carbon, the average particle size of which was about 5 µm. The electrophoretic particles 8 in the silicone oil demonstrated the positive polarity of charge. Then, a pattern of a hot-melt adhesive layer was formed on the bonding surface of the first substrate 1 to the second substrate 2, the first substrate 1 was laid on the bulkheads of the second substrate 2 while achieving alignment, and heat was applied thereto to bond them. The voltage applying circuit not shown was connected to it, thereby forming the display device.

A driving method will be described. Let Vd1 be the voltage applied to the first display electrodes 3 and to the projections 5 on the first display electrodes, and Vd2 be the voltage applied to the second display electrode 4 and to the projection 6 on the second display electrode. The display device was driven under the conditions: the driving voltages Vd1=+80 V and Vd2=−80 V or Vd1=−80 V and Vd2=+80 V;

the voltage applying time 100 msec. Then, the electrophoretic particles migrated onto the destination display electrode(s) without remaining on the starting display electrode(s), thus achieving excellent display contrast. Further, it was also confirmed that good display contrast was also able to be achieved even under the conditions: the driving voltages Vd1=+80 V and Vd2=−80 V or Vd1=−80 V and Vd2=+80 V; the voltage applying time reduced from 100 msec to 50 msec. The display contrast was not degraded even in the driving under the conditions: the voltage applying time 100 msec and the driving voltages lowered to Vd1=+50 V and Vd2=−50 V or Vd1=−50 V and Vd2=+50 V.

Comparative Example 1

The display devices were produced in the same manner as in Example 1 and Example 2 except that the auxiliary display electrodes (15, 16 in Example 1 or 5, 6 in Example 2) were not formed, and the displaying operation was conducted using the display devices under the same driving conditions.

When the display devices were driven under the conditions: the driving voltages Vd1=+80 V and Vd2=−80 V or Vd1=−80 V and Vd2=+80 V; the voltage applying time 100 msec, the electrophoretic particles stayed on the starting display electrode(s) in some pixels to cause degradation of contrast. Further, when the display devices were driven under the conditions: the driving voltages Vd1=+80 V and Vd2=−80 V or Vd1=−80 V and Vd2=+80 V; the voltage applying time reduced from 100 msec to 50 msec, there appeared such a tendency that more electrophoretic particles remained on the starting display electrode(s), thereby degrading contrast in certain cases. When the display devices were driven under the conditions: the voltage applying time 100 msec; the driving voltages lowered to Vd1=+50 V and Vd2=−50 V or Vd1=−50 V and Vd2=+50 V, there appeared such a tendency that more electrophoretic particles remained near the starting display electrode(s), particularly, near the center without migrating onto the destination display electrode(s).

What is claimed is:

1. An electrophoretic display device comprising a first substrate, at least two display electrodes of a first display electrode and a second display electrode placed on the first substrate, a second substrate placed in opposition to the first substrate, means for applying a desired voltage to each electrode, a transparent insulating liquid filling a space between the first substrate and the second substrate, and a plurality of colored electrophoretic particles dispersed in the transparent insulating liquid, in which the colored electrophoretic particles are made to migrate between the first display electrode and the second display electrode, thereby effecting switching of display, wherein on at least one of the first display electrode and the second display electrode, an auxiliary display electrode is placed at a portion including at least a portion at which an absolute value of a horizontal component of an electric field vector generated over the first display electrode and the second display electrode upon application of the voltages to the first display electrode and the second display electrode, becomes minimum.

2. The electrophoretic display device according to claim 1, wherein the auxiliary display electrode is electrically connected to at least one of the first and the second display electrodes located below the auxiliary display electrode.

3. The electrophoretic display device according to claim 1, wherein the auxiliary display electrode is a projecting structure provided on at least one of the first display electrode and the second display electrode.

4. The electrophoretic display device according to claim 3, wherein a height of the projecting structure is not less than 1 $\mu$m nor more than 20 $\mu$m.

5. The electrophoretic display device according to claim 3, wherein a width of the projecting structure is not less than 5% nor more than 20% of a width of the first display electrode or the second display electrode located below the projecting structure.

6. The electrophoretic display device according to claim 1, wherein the auxiliary display electrode is an electrode placed through an insulating layer on at least one of the first display electrode and the second display electrode.

7. The electrophoretic display device according to claim 6, wherein a thickness of the insulating layer is not less than 1 $\mu$m nor more than 20 $\mu$m.

8. The electrophoretic display device according to claim 6, wherein a width of the auxiliary display electrode is not less than 5% nor more than 20% of a width of the first display electrode or the second display electrode located through the insulating layer below the auxiliary display electrode.

9. The electrophoretic display device according to claim 1, wherein the auxiliary display electrode is transparent.

10. The electrophoretic display device according to claim 1, wherein a color of the auxiliary display electrode is viewed as the same as a color of the display electrode located below the auxiliary display electrode.

11. The electrophoretic display device according to claim 1, wherein the auxiliary display electrode is placed in a region including a pixel peripheral portion on at least one of the first display electrode and the second display electrode.

* * * * *

UNITED STATES PATENT AND TRADEMARK OFFICE
CERTIFICATE OF CORRECTION

PATENT NO. : 6,535,326 B2
DATED : March 18, 2003
INVENTOR(S) : Yoshinori Uno

It is certified that error appears in the above-identified patent and that said Letters Patent is hereby corrected as shown below:

<u>Title page,</u>
Item [56], References Cited, FOREIGN PATENT DOCUMENT, "2001249366 A" should read -- 2001-249366 A --.

Signed and Sealed this

Thirtieth Day of December, 2003

JAMES E. ROGAN
*Director of the United States Patent and Trademark Office*